Dec. 17, 1957   H. T. HOLSMAN   2,816,837
PACKAGING PROCESS AND APPARATUS
Filed July 21, 1952   2 Sheets-Sheet 2
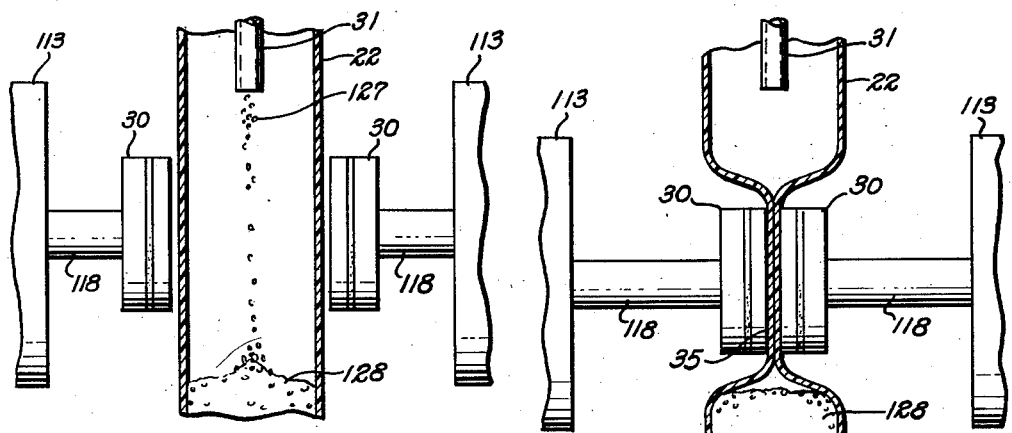
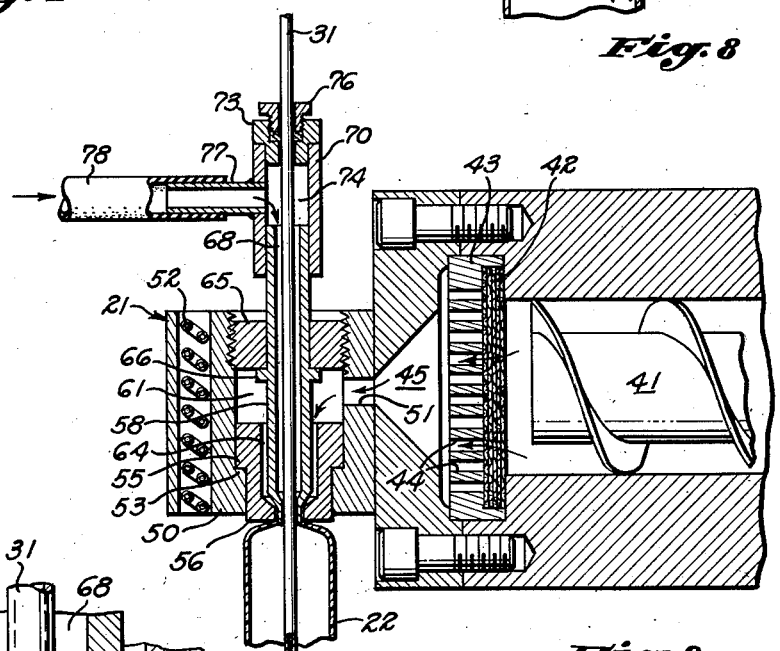
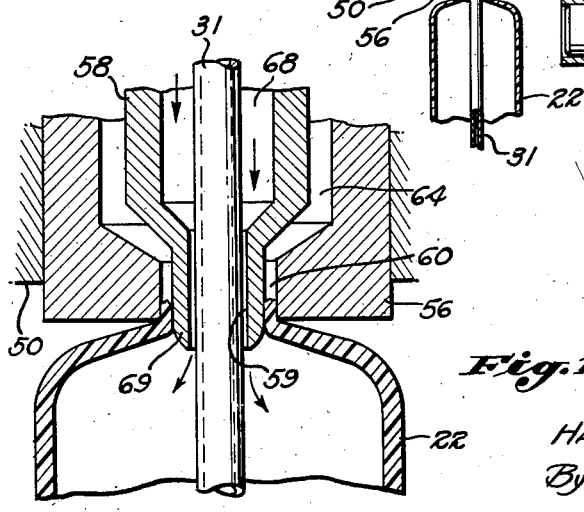
INVENTOR:
HENRY T. HOLSMAN
BY HIS ATTORNEYS
HARRIS, KIECH, FOSTER & HARRI

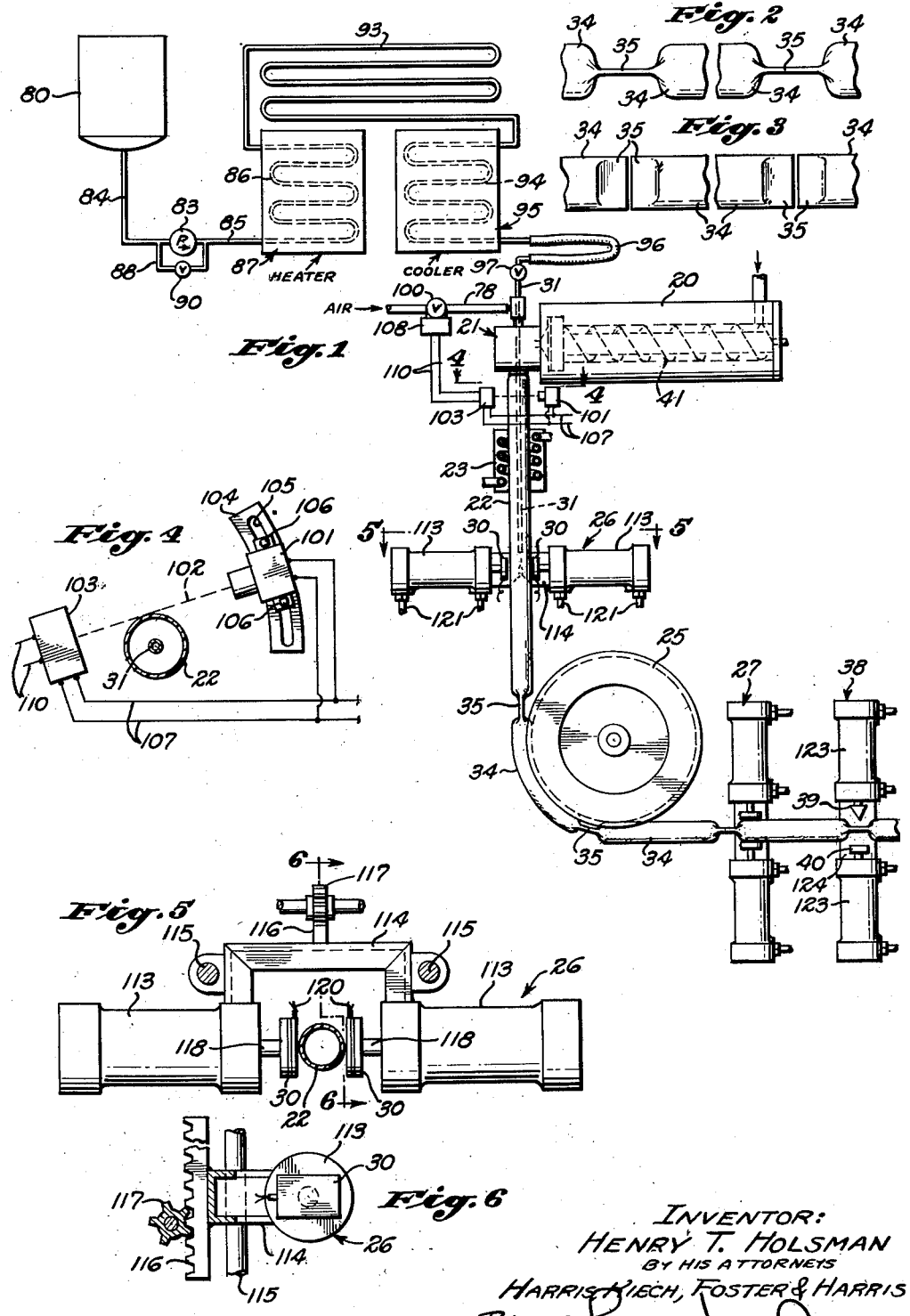

United States Patent Office 2,816,837
Patented Dec. 17, 1957

2,816,837

PACKAGING PROCESS AND APPARATUS

Henry T. Holsman, Santa Barbara, Calif.

Application July 21, 1952, Serial No. 300,007

9 Claims. (Cl. 99—171)

This invention relates to a method of and apparatus for packaging and preserving products and, preferably, is directed to a procedure and apparatus for aseptically enclosing sterilized portions of a product in sterilized containers for storage, handling, and distribution.

One broad object of the invention is to provide an economical commercial procedure for packaging or canning food, drug, or chemical products that may be carried out by relatively simple and inexpensive apparatus. This broad object is attained in part by utilizing inexpensive packaging material that may be fabricated at low cost, and, in part, by fabricating and filling the containers substantially simultaneously.

The invention is particularly applicable to the aseptic packaging of perishable food products, and will be described primarily in connection therewith, although it is to be understood that the invention has other and different uses and applications. Accordingly, although the term "food product" is used throughout the following specification, I do not intend to be limited thereto, but desire to include in the definition of such term any product, substance, or composition which may be aseptically packaged by the subject method and apparatus.

It has been common practice heretofore to fill and seal an unsterilized food product in an unsterilized container and then to apply sufficient heat to the sealed package to sterilize both the confined food product and all the inner surfaces of the container. While such a procedure serves its purpose of preserving a food product that would otherwise spoil in a short time, it accomplishes this purpose with the penalty of requiring excessive heat to insure complete sterilization throughout the volume of the confined food product. The excessive heat inevitably seriously injures the flavor, texture, color, and vitamin content of the product.

In the direction of eliminating this penalty of lowered quality, one technique recently developed is to sterilize the food product and the container separately and then to pack the sterile product in the sterile container in an aseptic manner. The advantage of this more recent food-packaging procedure is that processing the food product separately makes it possible to subject the product to high-temperature heat for a relatively short period of time and thus achieve complete sterilization without serious deleterious effect on the taste, texture, and color of the food. On the other hand, such a procedure is more costly than the older conventional canning process since it involves two separate sterilization operations for the food product and the containers, respectively, and since it requires great care and special precautions to carry out the packing step in a thoroughly aseptic manner.

An underlying concept of the present invention is to achieve the same objective by aseptically manufacturing the containers and at the same time packing the sterilized food product in the containers without further handling and while the containers are still sterile. Thus, the invention, in effect, eliminates sterilization of the containers as a separate step and in addition eliminates the usual need to store and handle bulky containers prior to the actual packing operation.

Another object of the invention is to pack a food product in relatively inexpensive, non-metallic containers, thus avoiding the expense and trouble of storing metal container stock as well as the need for metal-working machinery. This further object is attained by using plastic material for the containers and by forming the containers by an extrusion process.

A further object of the invention is to provide for carrying out the new procedure in a substantially continuous manner. Thus, in the preferred practice of the invention a food product is continually dispensed and a tubular container wall of sterile plastic material is continually extruded around the streaming food product. This tubular wall is sealed at intervals to form successive sealed containers, which containers may be linked together in groups by the continuous plastic material or may be cut apart to form individual containers.

An outstanding advantage of the presently disclosed process is that it makes possible the aseptic packing of food products in containers of relatively large diameter and, if desired, of relatively long length. Only containers of relatively small diameter and volume can be packed by the conventional method because of the necessity for penetration of sterilizing heat through the container wall to the center of the confined material. In this regard, a feature of the present invention is that it will benefit repack canners who, under the pressure of a peak load in a short packing season, have need for a method of packing a perishable product in bulk quantities for later repackaging in smaller containers between seasons. Since the extruded tube of the present invention may be of relatively large diameter and, where minimum handling is required, may be of relatively great length, the new process is eminently suited for the temporary bulk preservation of perishable food products.

Further objects of the invention, as will be explained, pertain to the handling and controlling of the extruded tube and the performance of operations to convert the extruded tube into the final filled containers.

In its broadest aspect, this invention contemplates the substantially simultaneous formation of a package and the filling of the package with a material or substance to be packaged.

The various objects and advantages of the invention will be understood in the light of the following detailed description and the accompanying drawings which are for the purpose of illustration only and in which:

Fig. 1 is a diagrammatic view showing a preferred apparatus for carrying out the invention;

Fig. 2 is a fragmentary side elevation of the package or tube showing its configuration after the sealing operations are performed;

Fig. 3 is a similar fragmentary plan view showing how the sealed portions of the tube may be cut to separate the individual containers;

Fig. 4 is a section taken as indicated by the line 4—4 of Fig. 1 showing how a photoelectric arrangement may be employed to control the diameter of the extruded tube;

Fig. 5 is a section taken as indicated by the line 5—5 of Fig. 1 showing the construction of a means for periodically sealing the tube;

Fig. 6 is a section taken as indicated by the line 6—6 of Fig. 5;

Fig. 7 is a fragmentary view on a large scale showing the sealing means in its retracted position;

Fig. 8 is a similar view showing the sealing means in its operating position;

Fig. 9 is an enlarged fragmentary section showing the construction of the extrusion head on the extrusion machine; and Fig. 10 is an enlarged fragment of Fig. 9.

General arrangement

It will be apparent to those skilled in the art that the basic steps of the process may be carried out in various ways with various devices within the scope and spirit of the appended claims. In the present embodiment of the invention, suitable plastic material processed by a conventional extrusion machine 20 is extruded through an extruder head generally designated 21 to form a continuous tube 22. The plastic material is processed and extruded under conditions of sufficiently high temperature, e. g., a temperature on the order of magnitude of 300° F., to make the extruded tube completely sterile. While the tube may be extruded at the diameter desired for the final package, preferably the extrusion aperture is of much smaller diameter and the issuing tube is inflated while still hot to the desired diameter. Also, while the tube 22 is preferably extruded vertically and downwardly, as shown in the drawing, and although this is a valuable feature of the invention, it will be apparent to those skilled in the art that the invention can be practiced by directing the extrusion in any other desired direction.

The newly extruded tube 22 may be cooled to a desired degree of hardness by the ambient air over an extensive path of travel, but preferably suitable cooling means such as a refrigerating coil 23 is provided for this purpose and to shorten the travel necessary for the tube to harden. The tube may be cooled, for example, to a temperature on the order of magnitude of 120° F.

After leaving the cooling zone, the tube 22 preferably passes around a take-away wheel 25 or other suitable conveying mechanism, and at some point in its travel the tube is suitably sealed, preferably by a "pinch" sealing operation involving the application of heat, although any suitable type of seal may be formed as desired without departing from the spirit of my invention. For this purpose, Fig. 1 shows two identical sealing means generally designated 26 and 27 respectively on opposite sides of the take-away wheel 25 to afford choice with respect to the points along the path of travel of the tube at which the sealing operation may be performed. Only one of the two sealing means will be employed in any given packing run, the choice being largely governed by the character of the food product that is being packaged so only the sealing means 26 will be specifically described. The sealing means 26 has a pair of sealing shoes 30 which co-operate to compress the tube 22 and to provide heat to cause the opposite walls of the tube to coalesce under the applied heat, thereby providing a seal to close the tube. As will be apparent, the sealing means 27 is designed to form a seal through the food product being packaged, and ordinarily only the sealing means 27 will be employed in the practice of the invention. However, with some liquids or solids to be packaged, it is difficult to form an adequate seal through the same, and in such case I prefer to employ the sealing means 26, which can be operated above the level of the material to be packaged in the tube 22 so that such material does not interfere with the sealing operation.

In the time interval between two successive sealing operations, the food product is supplied by a duct or pipe 31 that extends into the extruder head 21 and is adapted to discharge the food product into the interior of the extruded tube. Thus, the sucessive sealing operations form successive sealed tubular containers 34 interconnected by sealed portions 35 of the traveling tube. In Fig. 1, it is assumed that the upper sealing means 26 is in service, the second sealing means 27 being idle.

In some instances, the containers 34 may remain linked together in groups but usually the individual containers will be separated from the traveling tube by a cutting operation. For this purpose, Fig. 1 includes a cutting means generally designated 38 having a knife member 39 and a co-operating block 40. The knife member and block are moved toward each other from opposite sides of a sealed portion 35 to cut the adjacent containers 34 apart. Fig. 2 shows the sealed portions 35 before the cutting operation and Fig. 3 shows the sealed portions after the cutting operation.

The extrusion means

The particular extrusion machine 20 shown in the drawings by way of example is of the conventional screw-stuffer type in which, as best shown in Fig. 9, a screw 41 forces the plastic material through a stack of screens 42 backed by a die plate 43 with fine apertures 44, this treatment serving to homogenize the material. The processed plastic is forced through a tapered passage 45 into the extruder head 21 and preferably the extruder head is of the cross-head type positioned to extrude in a downward direction so that the extruded tube 22 tends to move away from the extrusion orifice by gravity.

It is contemplated that the plastic material will be heated in the extrusion machine 20 and extruder head 21 to sufficient temperature to thoroughly sterilize the extruded tube 22. The necessary heat may be supplied by special heating means supplemented by the friction of the plastic material in the press and in the extruder head. The temperature should be on the order of magnitude of 300° F. or higher. The material may be fed to the extrusion machine directly from blending rolls while the material is still soft but preferably the material will be supplied to the extrusion machine in the form of granulations, powder, or pellets of thermoplastic material. The extrusion machine 20 is conventional in construction and operation, it being only generally described herein for clarity.

Any suitable conventional plastic material may be used in various practices of the invention, including the following materials: unplasticized polyvinyl chloride; plasticized or modified polyvinyl chloride; unplasticized polyvinylidene chloride; plasticized or modified polyvinylidene chloride; cellulose acetate; cellulose acetate butyrate; unplasticized copolymer of vinyl chloride and vinyl acetate; plasticized or modified copolymer of vinyl chloride and vinyl acetate; methyl methacrylate; unplasticized polystyrene; plasticized or modified polystyrene; nylon; combinations of acrylonitrile and vinyl chloride or vinyl chloride vinyl acetate copolymers; casein; and cellulose nitrate.

It is essential that the extruder head 21 have a suitable central or inner opening surrounded by an annular extrusion orifice for the plastic material, the purpose of the inner opening being to permit introduction of the food product that is supplied by the pipe 31. In the preferred practice of the invention, a second central or inner opening is provided inside the extrusion orifice for the purpose of admitting a sterile fluid, such as, for example, air, to inflate the extruded tube to the desired diameter. In the present arrangement, one of the two inner openings is concentric to the other inside the diameter of the plastic extrusion orifice so that the arrangement comprises an inner axial opening and a surrounding annular opening with these two openings surrounded in turn by the annular extrusion orifice. The food product may be introduced through either of the two inner openings while the sterile air is introduced through the other. If it is desired to extrude the tube 22 with the same diameter as that of the extrusion orifice in the head 21 and without expansion, it is not necessary in most cases to inject sterile air or other fluid. It is to be noted, also, that where the food product to be packaged is oxidizable or otherwise reactive with air, it may be desirable to substitute an inert gas, such as nitrogen, or even an inert liquid, for the air described in connection with the preferred practice of the invention. Thus, although the preferred practice of the invention is described as utilizing a sterile air to expand the extruded tube 22, I do not desire to be limited thereto, but contemplate the use of any fluid which is compatible for the purpose desired in packaging any particular food product.

It will also be apparent that in the packaging of certain types of materials by the instant invention it may be desirable to incorporate a treating agent or preservative in the sterile air or other fluid injected into the tube 22, for the purpose of suitably treating the material being packaged, and this is likewise contemplated by my invention. Broadly considered, an important feature of the invention is the mixing of two substances in the tube 22 as the tube is being extruded.

In the construction shown in the drawings, the extruder head 21 has a cylindrical body 50 with a peripheral port 51 in communication with the extrusion passage 45 of the extrusion press 20. Usually it is desirable to incorporate a suitable heating element 52 in the cylindrical body 50 to maintain the plastic in the extrusion head at the desired temperature level. The cylindrical body 50 is formed with an inner annular shoulder 53 for abutment by a circumferential shoulder 55 of an outer orifice member 56. The outer orifice member 56 is tapered as shown to a relatively small discharge diameter. A tubular inner orifice member tapers to a neck 59 of reduced diameter, which neck is positioned inside the discharge end of the outer orifice member 56 to form therewith an annular extrusion orifice 60 for the plastic, as may be seen in Fig. 10. This arrangement provides an annular chamber 61 inside the extruder head 21 in communication with the extrusion machine 20 and an annular passage 64 leading downward to the extrusion orifice 60. The annular chamber 61 is closed from above by a suitable threaded bushing 65 that embraces the inner orifice member 58 in a fluid-tight manner in abutment against a circumferential flange 66 of the inner orifice member.

The pipe 31 that serves as a duct for introducing the sterile food product extends through the inner orifice member 58 to define therewith an annular passage 68 leading to an annular nozzle 69 (Fig. 10) for the introduction of air or other fluid into the extruded tube 22. The upper end of the inner orifice member 58 extends into a tubular member 70 that is closed by a bushing 73 to form a chamber 74 in communication with the annular passage 68. The bushing 73 is provided with a suitable packing gland 76 to seal the chamber 74 against leakage, and the chamber is provided with an inlet nipple 77 that is connected to a supply hose 78 from a suitable source of sterile air or other fluid. Although the pipe 31 and the nozzle 69 are preferably concentric, as illustrated, this is not essential, and it will also be apparent that although the pipe 31, the nozzle 69, and the orifice 60 are circular or annular in cross section, this, also, is not essential, and that the same may be made to any desired cross-sectional configuration. Consequently, where the tube 22 is characterized herein as tubular or tubular in form, I intend to include therein any desired cross-sectional configuration which is hollow in character.

*Means to supply the sterilized food product*

While any suitable arrangement may be employed to feed the sterilized food product to the food duct 31, the preferred practice of the invention employs flash sterilization, the food material being sterilized by the application of a relatively high temperature, e. g., a temperature on the order of magnitude of 300° F., for a relatively short period of time. For example, the food product may be heated to a temperature of 280° F.–290° F. for a period as short as 5–10 seconds to achieve the desired result. The specific sterilizing equipment is not a part of this invention, but will generally be described.

In the arrangement shown in the drawings, the raw food product is placed in a suitable supply tank 80 which may be provided with the usual agitator means (not shown). A suitable pump 83 connected to the bottom of the supply tank 80 by an intake pipe 84 has a discharge pipe 85 connected with a coil 86 in a heater 87. The particular heater 87 of the present embodiment of the invention is a heat exchanger employing superheated steam. Since the pump 83 places the food product under pressure, the heater 87 functions as a pressure cooker. For pressure regulation a bypass pipe 88 may shunt the pump 83, the bypass being provided with a suitable relief valve or pressure-regulating valve 90. When the pressure on the discharge side of the pump 83 exceeds a selected pressure determined by the adjustment of the valve 90, the valve opens to permit recirculation through the pump.

From the heater coil 86 the stream of food product in process passes through a holding tube 93 to permit the food material to remain at an elevated temperature for a desired period of time and then the food stream passes through a coil 94 of a cooler or refrigerating device 95. The cooling coil 94 is connected with the previously mentioned food duct or pipe 31 by a suitable hose 96 to permit freedom for adjustment of the food duct axially in the extruder head 21. The food duct or pipe 31 may be adjusted as desired to deposit the food product in a relatively cool part of the tube 22. In some instances, the pipe 31 may extend approximately 3 feet into the extruded tube. In other instances, the pipe may extend 10 to 15 feet into the tube. It will be apparent that the pipe 31 should extend into the extruded tube 22 to at least a point at which the tube is solid enough to receive the food product to be introduced, and that the actual distance in any particular case will depend upon the nature and temperature of the particular food product so introduced. A suitable valve 97 may be provided at the outer end of the food duct 31 for control of flow of the food product.

*Means to process the extruded tube*

The supply of sterile air or other fluid to the extruder head 21 through the hose 78 may be controlled by a suitable valve 100 and preferably a suitable arrangement is provided for automatically regulating the valve 100 for close control of the diameter to which the newly extruded tube 22 is inflated. For this purpose a lamp 101 may project a light beam 102 toward a photoelectric control device 103 along a path for interception by the extruded tube 22 at the desired diameter of the tube. As shown in Fig. 4, the lamp 101 may be adjustably supported by an arcuate bracket 104 having a slot 105. The lamp 101 may be anchored at any desired position by tightening two bolts 106 that extend through the slot 105, thus changing the path of the light beam 102 for interception at various diameters of the extruded tube 22. The lamp 101 and the photoelectric control device 103 are both energized by a pair of leads 107 and the photoelectric device is connected to a suitable valve-actuating mechanism 108 by a pair of wires 110. Whenever the diameter of the newly extruded tube 22 contracts sufficiently to permit the light beam 102 to reach the photoelectric control device 103, the valve 100 is operated automatically to admit air until the diameter of the extruded tube increases sufficiently to again cut the light beam, whereupon the flow of additional air is cut off.

The sealing means 26, as best shown in Figs. 5 and 6, comprises a pair of oppositely positioned air cylinders 113 mounted on a U-shaped frame or carriage 114 that is slidable along a pair of parallel guide rods 115, the two guide rods being parallel to the path of movement of the extruded tube 22. Fixedly mounted on the carriage 114 is a longitudinal rack 116 that is engaged by a suitably driven pinion 117. Each of the air cylinders 113 is provided with a piston (not shown) and a piston rod 118 carrying one of the two sealing shoes 30. Each sealing shoe 30 includes a suitable element energized by a pair of wires 120, which heating elements may be simple resistance heaters or may be a pair of conventional high-frequency electrodes for dielectric heating of the extruded tube.

The two air cylinders 113 are each provided with a pair of air hoses 121 for control by remote valve means in a manner well known in the art. With the carriage 114 at a starting position, a sealing operation is performed by admitting compressed air to the two cylinders 113 to cause the two sealing shoes 30 to press against the traveling tube 22 from opposite sides and at the same time the pinion 117 is operated to shift the carriage 114 in the same direction and at the same rate of speed as the traveling tube 22. The sealing pressure by the shoes 30 with the sustained application of heat is contained for a sufficient period to cause the opposite walls of the tubes to fuse together and thus form one of the previously described sealed portions 35 that divides the traveling tube into individual sealed containers 34, the sealing operation being illustrated in Figs. 7 and 8. At the end of the sealing period the two shoes 30 are retracted by the air cylinders 113 and the rotation of the pinion 117 is reversed to return the carriage 114 to its starting position.

The cutting means 38 may be of the same general construction and operates in the same general manner as the sealing means just described. Thus, the cutting means 38 may comprise a pair of air cylinders 123 mounted on a U-shaped carriage 124 that is controlled and operated in the same manner as the previously described carriage 114. One of the air cylinders 123 reciprocates the previously mentioned knife member 39 and the other reciprocates the co-operating cutting block 40, which block may be a piece of wood or other suitable material.

With the carriage 124 at a starting position, a cutting operation is performed by moving the carriage 124 in the same direction and at the same rate as the traveling tube 22 and at the same time advancing the blade 39 and the block 40 toward each other to sever the traveling tube at an intermediate point of one of the sealed portions 35 of the tube.

Operation

The basic process and the mode of operation of the described apparatus may be readily understood from the foregoing description. To start a run with a food product to be packaged in a sterile condition, care is taken to sterilize all parts of the apparatus that might cause contamination. The food duct 31 may be preheated for this purpose. A feature of the invention, however, is that the heat applied to the food product and the heat generated at the extrusion machine 20 and the extruder head 21 may be relied upon to carry out the major part, if not all, of the necessary preparatory sterilization. Thus, sterile conditions may be established merely by initiating normal operation and discarding the first few feet of the processed tube 22 with the food product therein.

In passing through the heater 87, the stream of food is raised to the desired temperature which, as heretofore indicated, may be in the range of 270°–300° F., which renders it aseptic, and then travels for a few seconds, e. g., 5–10 seconds, through the holding tube 93 before reaching the cooler 95. The valve 97 either may be adjusted for constant flow of the processed food or may be intermittently closed for the duration of a sealing step, but in any event the rate of flow through the valve will be governed by the rate at which the tube 22 is extruded.

Figs. 7 and 8 illustrates operation with intermittent closing of the valve 97. Fig. 7 shows the food product issuing in a stream 127 from the food duct 31 to form a body of food 128 in the traveling tube 22 above one of the sealed portions 35 of the tube. In Fig. 8, the food supply valve 97 has been closed to cut off the fluid stream 127 and the upper sealing means 26 has been operated to carry out a sealing operation as heretofore described.

If the supply valve 97 is left open to deposit the processed food continuously in the continuously extruded tube 22, it may be desirable to have the sealing operation performed by the second sealer 27. When the second sealer 27 operates in the manner just described, the compression of the tube between the two sealing shoes 30 causes the food product to be substantially entirely displaced from the area of the tube under pressure.

The cutting means 38 may be operated to sever each successive container 34 by cutting the tube across each successive sealed portion 35 as indicated in Figs. 2 and 3, or may be operated only at intervals to form groups of containers in which the individual containers are interlinked by the sealed portions 35. In some practices of the invention, the cutting means 38 may merely partially cut the tube across the sealed portions 35, thus forming interlinked containers 34 that may be readily separated from each other by the ultimate consumer. It will be readily apparent also that for the purposes of repack canning the containers 34 may be as large in diameter and as long as practical for handling and temporary storage. In practice, the containers 34 may vary in diameter up to 36 inches, or even larger, depending upon the plastic material employed, the diameter of the orifice 60, the speed of haul-off or take-away of the tube 22 from the head 21, and the air pressure used for inflation.

The basic process may be adapted to the packaging of various fluid and semi-solid food products, including, for example, whole milk, orange juice, banana puree, soups, and desserts of the starch or custard type. It is equally adaptable to the packaging of drugs, chemical preparations, and other substances. The preferred sterilization of the product by the application of a high temperature for a relatively short period may be relied upon, when employed, to asepticize the food product thoroughly and yet have relatively little effect on the flavor, color, texture, and vitamin content of the product. Thus, the process may be used for processing food materials that are extremely heat-sensitive without serious degradation of delicate flavoring constituents and color pigments. In this respect, the process compares favorably with the more expensive quick-freezing process and, of course, does not require the protection of continuous refrigeration from the packaging plant to the point of ultimate consumption.

My description in specific detail in a typical practice of the invention will provide adequate guidance for those skilled in the art who may have occasion to apply the same basic principles in various ways for various products. The above description will also suggest various changes, substitutions, and other departures from the disclosure that properly lie within the spirit and scope of the appended claims.

I claim as my invention:

1. An aseptic method of packaging a substance, said method including the steps of: extruding a tube of plastic material with sufficient heat in the extrusion operation to make the tube sterile; sterilizing the substance; introducing the sterile substance aseptically into the extruded tube; and compressing the extruded tube at intervals from opposite sides with application of heat to seal together the opposite walls of the tube thereby forming the tube into a series of sealed containers that may be separated by severing the tube across the sealed portions thereof.

2. An aseptic method of packaging a substance, said method including the steps of: extruding thermoplastic material to form a tube at sufficient temperature to sterilize the tube walls; introducing a sterile fluid into the tube to expand the heated tube to a desired diameter; passing the heated tube through a cooling zone to harden the tube wall; pressure-sealing the cooled tube at intervals to form successive sealed containers; sterilizing the substance; and introducing the sterile substance aseptically through said heated portion of the tube into the cooled portion of the tube for enclosure by the successive pressure-sealing operations.

3. A continuous, aseptic method of packaging a substance, involving simultaneous package formation and substance and package sterilization, and including the steps of: extruding thermoplastic material into a tube with the application of sufficient heat to sterilize the tube; flash sterilizing the substance; cooling the flash-sterilized substance; introducing the flash-sterilized and cooled substance into the tube through the extrusion zone and discharging same into the tube in a zone spaced from the extrusion zone, while the tube is being extruded; and heat sealing the tube closed at spaced intervals after the flash-sterilized and cooled substance has been discharged thereinto so as to form a series of sealed packages each containing a quantity of said flash-sterilized and cooled substance.

4. The method set forth in claim 3 including the additional step of inflating the tube with a sterile fluid through the extrusion zone while the tube is being extruded and while the flash-sterilized and cooled substance is being discharged thereinto.

5. The method defined in claim 3 including the additional step of inflating the tube with a sterile fluid through the extrusion zone to a diameter larger than the diameter of the tube as it emerges from the extrusion zone, all while extruding the tube and while discharging the flash-sterilized and cooled substance thereinto.

6. An apparatus for the aseptic packaging of a substance, comprising: an extruder head for plastic materials having a central opening and a surrounding annular opening; a press to extrude plastic material through said annular opening to form a tube with sufficient heat to sterilize the tube; means to seal the opposite walls of the tube together at intervals, thereby forming the tube into a series of sealed containers; means providing a flash sterilization zone and a cooling zone; and means to move said substance in a stream through said two zones and through said head and said central opening of the head into said tube for enclosure by said containers, including a duct extending into said head and through said central opening for carrying said stream into said tube at a distance from said head.

7. A combination as set forth in claim 6, in which said duct is adjustable longitudinally in said opening for depositing said substance in the tube at selected distances from said head.

8. In an apparatus for aseptically packaging a substance, the combination of: an extruder head for plastic material having two central openings and a surrounding annular opening; a press to extrude plastic material through said annular opening to form a tube; means to sterilize said tube; means to introduce a sterile fluid through one of said central openings to expand the heated tube; means responsive to the diameter of the expanded tube to control the amount of fluid introduced through said one central opening; means to seal the opposite walls of the tube together at spaced portions thereof, thereby to form the tube into a series of sealed containers; and means to introduce a sterile substance to be packaged through the other of said central openings into said tube for enclosure by said containers.

9. An apparatus for the aseptic packaging of a substance, comprising: an extruder head for plastic materials having two central openings and a surrounding annular opening; a press to extrude plastic material through said annular opening to form a tube with sufficient heat to sterilize the tube; means, including control means responsive to the diameter of said tube, to introduce a fluid through one of said central openings to expand said tube; means to seal the opposite walls of the tube together at intervals, thereby forming the tube into a series of sealed containers; means providing a flash sterilization zone and a cooling zone; and means to move said substance in a stream through said zones and the other of said central openings into said tube for enclosure by said containers.

References Cited in the file of this patent

UNITED STATES PATENTS

| | | |
|---|---|---|
| 1,270,798 | Dunkley | July 2, 1918 |
| 1,628,333 | Schaub | May 10, 1927 |
| 2,442,161 | Bergstein | May 25, 1948 |
| 2,449,139 | Posner | Sept. 14, 1948 |
| 2,569,217 | Bagdigian | Sept. 25, 1951 |
| 2,607,696 | Kunz | Aug. 19, 1952 |
| 2,613,488 | Attride | Oct. 14, 1952 |
| 2,639,567 | Murdock et al. | May 26, 1953 |

FOREIGN PATENTS

| | | |
|---|---|---|
| 17,867 | Australia | Aug. 29, 1935 |

U. S. DEPARTMENT OF COMMERCE
PATENT OFFICE

CERTIFICATE OF CORRECTION

Patent No. 2,816,837 December 17, 1957

Henry T. Holsman

It is hereby certified that error appears in the printed specification of the above numbered patent requiring correction and that the said Letters Patent should read as corrected below.

Column 6, line 67, after "suitable" insert -- heating --; column 7, line 7, for "contained" read -- continued --.

Signed and sealed this 4th day of March 1958.

(SEAL)
Attest:

KARL H. AXLINE
Attesting Officer

ROBERT C. WATSON
Commissioner of Patents